(12) United States Patent
Kojima et al.

(10) Patent No.: US 9,231,329 B2
(45) Date of Patent: Jan. 5, 2016

(54) PIVOTAL COVER (75) Inventors: Hiroshi Kojima, Makinohara (JP);
Takashi Tsukamoto, Makinohara (JP);
Michitake Masuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 162 days.

(21) Appl. No.: 14/119,957

(22) PCT Filed: May 22, 2012

(86) PCT No.: PCT/JP2012/062985
§ 371 (c)(1),
(2), (4) Date: Nov. 25, 2013

(87) PCT Pub. No.: WO2012/165210
PCT Pub. Date: Dec. 6, 2012

(65) Prior Publication Data
US 2014/0094045 A1  Apr. 3, 2014

(30) Foreign Application Priority Data
Jun. 2, 2011  (JP) .................................. 2011-124052

(51) Int. Cl.
*H01R 13/44* (2006.01)
*H01R 13/447* (2006.01)
(Continued)

(52) U.S. Cl.
CPC ............ *H01R 13/447* (2013.01); *B60L 3/0069* (2013.01); *B60L 11/1818* (2013.01);
(Continued)

(58) Field of Classification Search
CPC .................................................. H01R 13/447
USPC ................... 439/142, 144; 220/844, 291, 292
See application file for complete search history.

(56) References Cited

U.S. PATENT DOCUMENTS 4,072,381 A * 2/1978 Burkhart et al. .............. 439/144
4,381,879 A * 5/1983 Ehrenfels et al. ............. 439/142
(Continued)

FOREIGN PATENT DOCUMENTS

GB  2323719 A  9/1998
JP  04-022941 U  2/1992
(Continued)

OTHER PUBLICATIONS

International Search Report dated Jun. 26, 2012, issued for PCT/JP2012/062985.
(Continued)

*Primary Examiner* — Neil Abrams
(74) *Attorney, Agent, or Firm* — Locke Lord LLP; James E. Armstrong, IV; Brian S. Matross (57) ABSTRACT

Configuration of a hinge for avoiding likely collection of water provides a connector to prevent difficulty of opening or closing a cover by freezing of the hinge. A connector mounted in an electric vehicle and connected with a connector of a charging cable is provided with a housing, a cover rotatively pivoted about the housing so as to open or close the cover, and a shaft. The cover is provided with a pair of cover side mounting plates including a shaft hole passing the shaft therethrough, and the housing is provided with a pair of housing side mounting plates including a shaft hole passing a shaft therethrough, and positioning the pair of cover side mounting plates therebetween. The pair of cover side mounting plates is provided with a boss cylindrically upstanding from each of faces opposite to the pair of housing side mounting plates, and passing the shaft therethrough.

1 Claim, 9 Drawing Sheets (51) Int. Cl.
*B60L 11/18* (2006.01)
*B60L 3/00* (2006.01)
*B60K 15/05* (2006.01)

(52) U.S. Cl.
CPC ... *B60K2015/053* (2013.01); *B60K 2015/0576* (2013.01); *B60L 2240/662* (2013.01); *B60L 2240/667* (2013.01); *B60L 2270/32* (2013.01); *B60L 2270/34* (2013.01); *Y02T 10/7005* (2013.01); *Y02T 90/14* (2013.01)

(56) References Cited

U.S. PATENT DOCUMENTS

| | | | | |
|---|---|---|---|---|
| 4,784,610 | A | * | 11/1988 | Stuart ............... H01R 13/633 174/67 |
| 5,800,188 | A | * | 9/1998 | Barber et al. ............... 439/142 |
| 6,564,427 | B1 | | 5/2003 | Flegel |
| 7,240,402 | B2 | * | 7/2007 | Suzuki et al. ............... 16/330 |
| 2002/0115319 | A1 | | 8/2002 | Mori |

FOREIGN PATENT DOCUMENTS

| | | |
|---|---|---|
| JP | 2001-102772 A | 4/2001 |
| JP | 2002-216882 A | 8/2002 |
| JP | 2005-158345 A | 6/2005 |
| WO | WO-2011/042783 A1 | 4/2011 |

OTHER PUBLICATIONS

Notification of Reasons for Refusal mailed Jan. 20, 2015, issued for the Japanese patent application No. 2011-124052 and English translation thereof.

Supplementary European Search Report dated Oct. 9, 2014, issued for the corresponding European patent application No. 12793643.3.

* cited by examiner

PIVOTAL COVER

TECHNICAL FIELD

This invention relates to a connector having a cover that is connected with a connector of such a charging cable.

BACKGROUND ART

A connector 201 shown in FIGS. 7 to 11 is a conventional one that has been employed for an electric vehicle, and that is connected with a connector 9 of a charging cable for charging a battery of the electric vehicle (see PTL 1).

The connector 201 is provided with a housing 202, a cover 203 rotatively pivoted about the housing 202 so as to open or close openings 221a and 222a of the housing 202, a lock 204 rotatively pivoted about the housing 202 so as to keep a state by engaging with an edge 233 of the cover 203 in which the cover 203 covers the openings 221a and 222a, with the openings 221a and 222a covered, and shafts 207 and 208.

The aforementioned housing 202 is formed of synthetic resin, which is provided with a housing main body 220, a flange 223 annularly disposed on outer surface of the housing 220, a pair of housing side mounting plates 224 disposed away from each other on the outer surface of the housing 220 for attaching the cover 203, and a pair of lock mounting plates 225 disposed away from each other on the outer surface of the housing 220 for attaching the cover 204. In the pair of housing side mounting plates 224 is disposed a shaft hole 224a passing a shaft 207 therethrough. Also, in the pair of lock mounting plates is disposed a shaft hole passing a shaft 208 therethrough.

Figure 7:
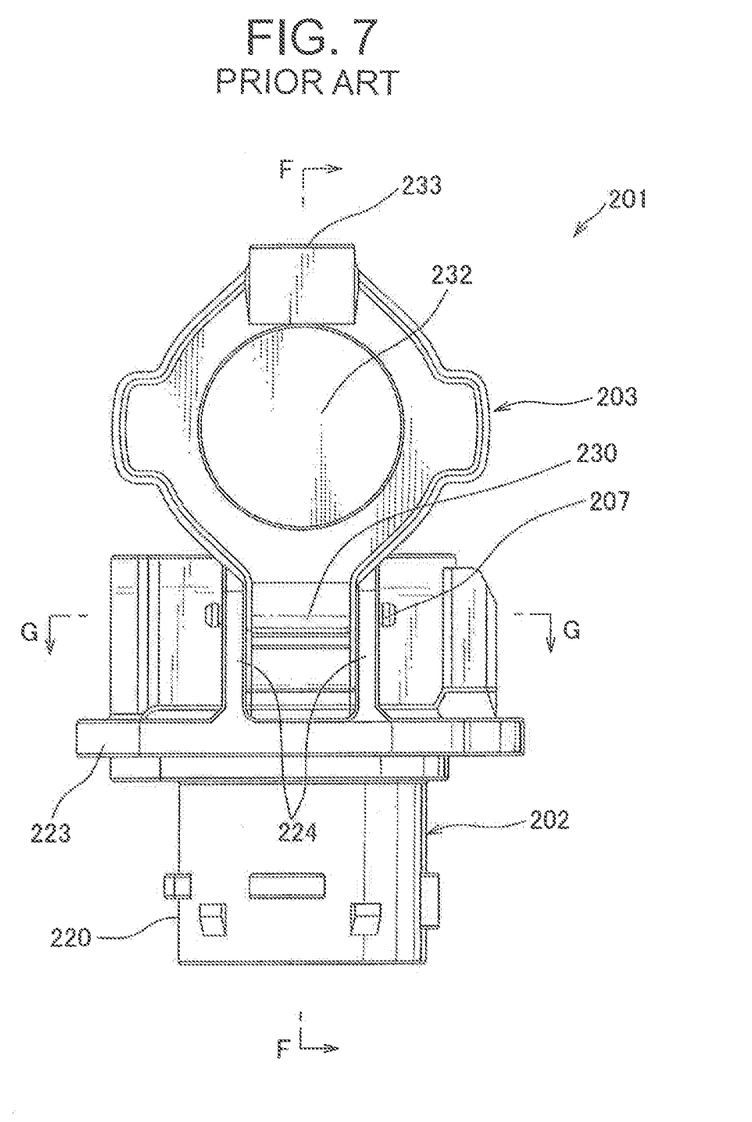
FIG. 7 is a plane view illustrating a conventional connector.
Figure 9:
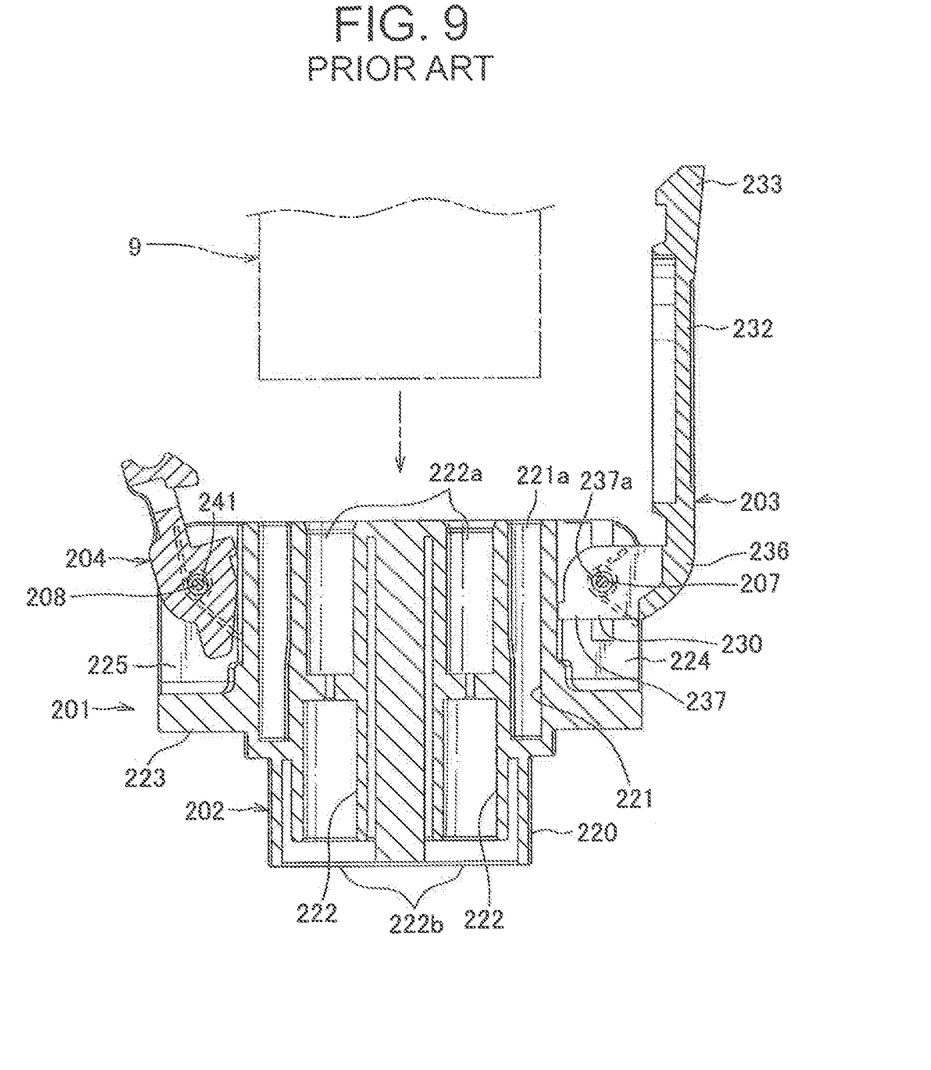
FIG. 9 is a cross-sectional view taken from F-F line in FIG. 7.
Figure 10:
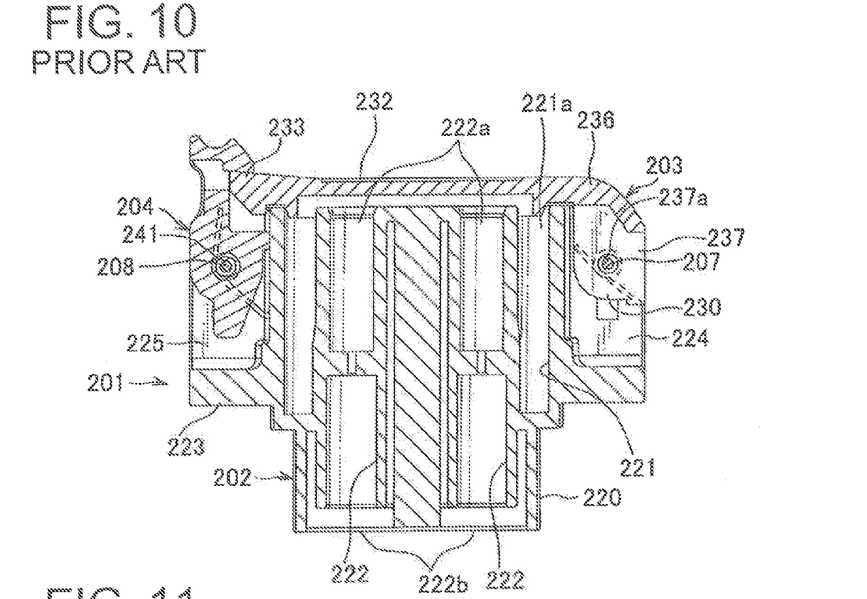
FIG. 10 is a cross-sectional view illustrating a state that the cover shown in FIG. 9 covers an opening of the housing.

The aforementioned housing 220 is provided with a plurality of terminal cavities 222, and a housing cavity 221 receiving a hood of the connector 9 of the charging cable. The terminal cavity 222 extends in a direction of engaging with the connector 9 of the charging cable, at an upper end and a lower end of which openings 222a and 222b are formed, respectively. From the lower end opening 222b is inserted a terminal having electric wire (not shown), from the upper end opening 222a is inserted a terminal of the connector 9 of the charging cable (not shown). These terminal having electric wire and the connector 9 of the charging cable 9 are engaged with each other within the terminal cavity 222.

Figure 8:
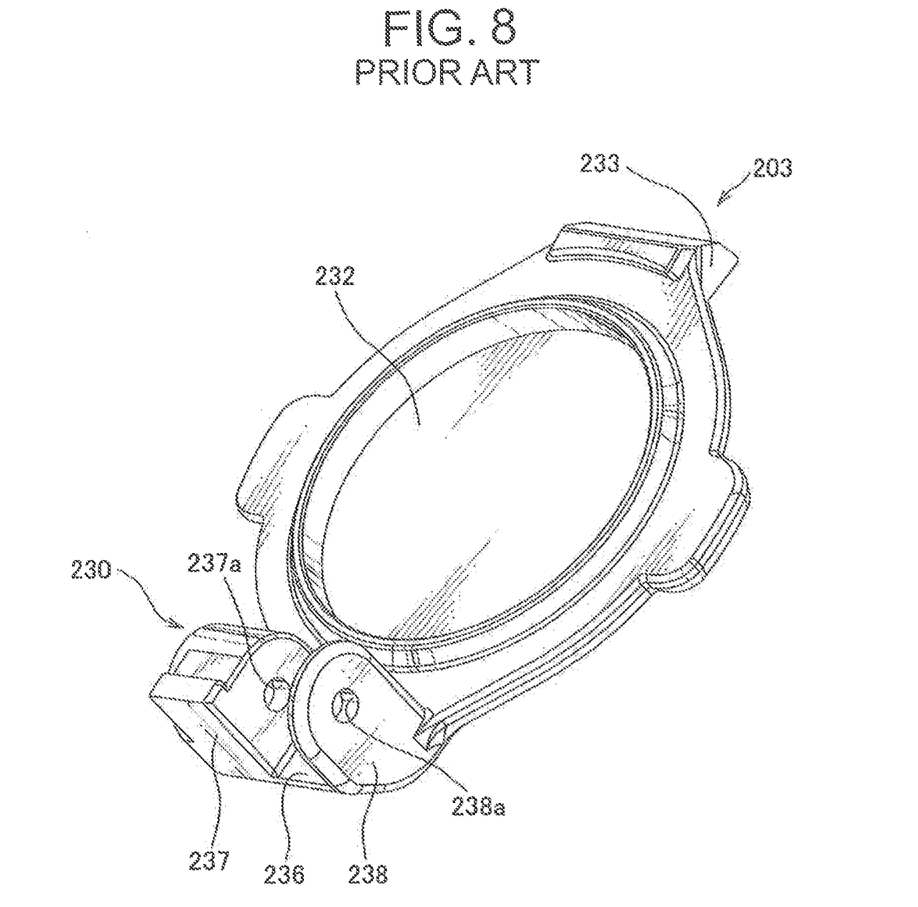
FIG. 8 is a perspective view illustrating the cover shown in FIG. 7.

The aforementioned cover 203 is formed of synthetic resin, which is provided with a plate 232 stacked on the upper end of the housing 220, an edge 233 disposed on an outer edge of the plate 232, and a base 230 disposed on an outer edge of the plate 232 and an opposite side of the edge 233. The base 230, as shown in FIG. 8, is provided with a extension 236 extending from an outer edge of the plate 232, a pair of cover side mounting plates 237 and 238 upstanding from the extension 236 and opposing each other. The pair of cover side mounting plates 237 and 238 is provided with shaft holes 237a and 238a passing the shaft 207 therethrough.

Figure 11:
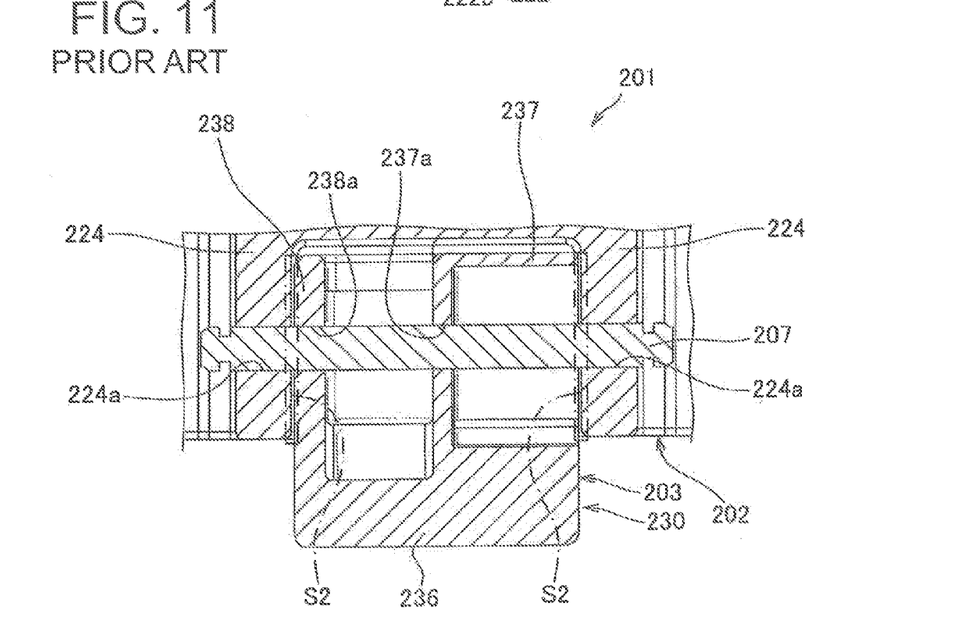
FIG. 11 is a cross-sectional view taken from G-G line in FIG. 7.

Also, the pair of cover side mounting plates 237, 238 is positioned between the pair of housing side mounting plates 224, and the shaft 207 is passed through the shaft holes 237a, 238a of the pair of cover side mounting plates 237, 238 and the shaft hole 224a of the pair of housing side mounting plates 224, resulting in the cover 203 being rotatively pivoted about the housing 202. The cover 203, when the connector 9 of the charging cable is inserted into the housing 202, also opens the openings 221a, 222a, and closes the openings 221a, 222a except in the case of charging to prevent water or dust from entering therein.

The aforementioned lock 204 is formed of synthetic resin, and provided with a shaft hole 241 passing the shaft 208 therein. The lock 204 is positioned between the pair of lock mounting plates 225 of the housing 202, and the shaft 208 is passed through the shaft hole 241 and a shaft hole of the pair of lock mounting plates 225, so as to be rotatively pivoted about the housing 202.

CITATION LIST

Patent Literature

[PTL 1]
Japanese Patent Application Laid-Open Publication No. 2002-216,882

SUMMARY OF INVENTION

Technical Problem

Disadvantageously, the aforementioned conventional connector 201 has posed drawbacks as discussed below. Namely, the connector 201, as shown in FIG. 11, has a gap reduced between each of the housing side mounting plate 224 and each of the cover side mounting plate 237, 238 that oppose each other in order to avoid rattle in the cover 203. Consequently, in the small gap S2 between each of the housing side mounting plate 224 and each of the cover side mounting plate 237, 238 water likely collects such as dew condensation water or rain by its surface tension, which has induced drawback that the water is frozen in low temperature to cause the cover 203 to unlikely open or close.

It should be noted that in order to prevent the aforementioned water from collecting, enlarging the gap between each of the housing side mounting plate 224 and each of the cover side mounting plate 237, 238 caused drawback that the enlarged gap prevents the cover 203 from functioning properly. Furthermore, in order to reduce collection of water in the aforementioned gap S2, shrinking of the pair of housing side mounting plate 224 and the pair of cover side mounting plate 237, 238 caused drawbacks of stiffness thereof being decreased.

Accordingly, object of the present invention is to provide a connector able to prevent a cover from unlikely opening or closing caused by freezing of a hinge by forming the hinge such that water unlikely collects.

Solution to Problem

In order to attain the above-mentioned object, the invention of a first aspect provides a connector, comprising: a housing provided with a pair of housing side mounting plates including a shaft hole passing a shaft therethrough; a cover rotatively pivoted around the housing, covering an opening of the housing, and provided with a pair of cover side mounting plates including a shaft hole passing the shaft therethrough, the pair of cover side mounting plates being positioned between the pair of housing side mounting plates; and a boss disposed on one of the pair of cover side mounting plates and the pair of housing side mounting plates, cylindrically upstanding from each of faces opposite to the other of the pair of cover side mounting plates and the pair of housing side mounting plates, and passing the shaft therethrough.

Preferably, in the invention related to the connector of the first aspect, wherein at least one of projection and depression is disposed on a peripheral surface of the boss.

Advantageous Effects of Invention

According to the invention of the first aspect since the boss disposed on one of the pair of cover side mounting plates and the pair of housing side mounting plates, cylindrically upstanding from each of faces opposite to the other of the pair of cover side mounting plates and the pair of housing side mounting plates, and passing the shaft therethrough, it is made possible to reduce a surface area of a portion forming a fine gap between each of the housing side mounting plate and each of the cover side mounting plates that oppose each other so as to reduce collection of water in the fine gap. Therefore, in the case of freezing of collection of water in the fine gap, it is easy to shear an ice because the ice is too small. Accordingly, it is made possible to prevent the cover from unlikely opening or closing by freezing of the hinge.

According to the invention, since on a peripheral surface of the boss at least one of projection and depression is formed, it is made possible to make large a shear stress working on an ice made between each of the housing side mounting plate and each of the cover side mounting plates that oppose each other by rotating the cover, so as to readily shear the ice. Therefore, it is possible to prevent the cover from unlikely opening or closing by freezing of the hinge.

DESCRIPTION OF EMBODIMENTS

A connector relevant to one embodiment of the present invention will be discussed with reference to FIGS. 1 to 5.

Figure 1:
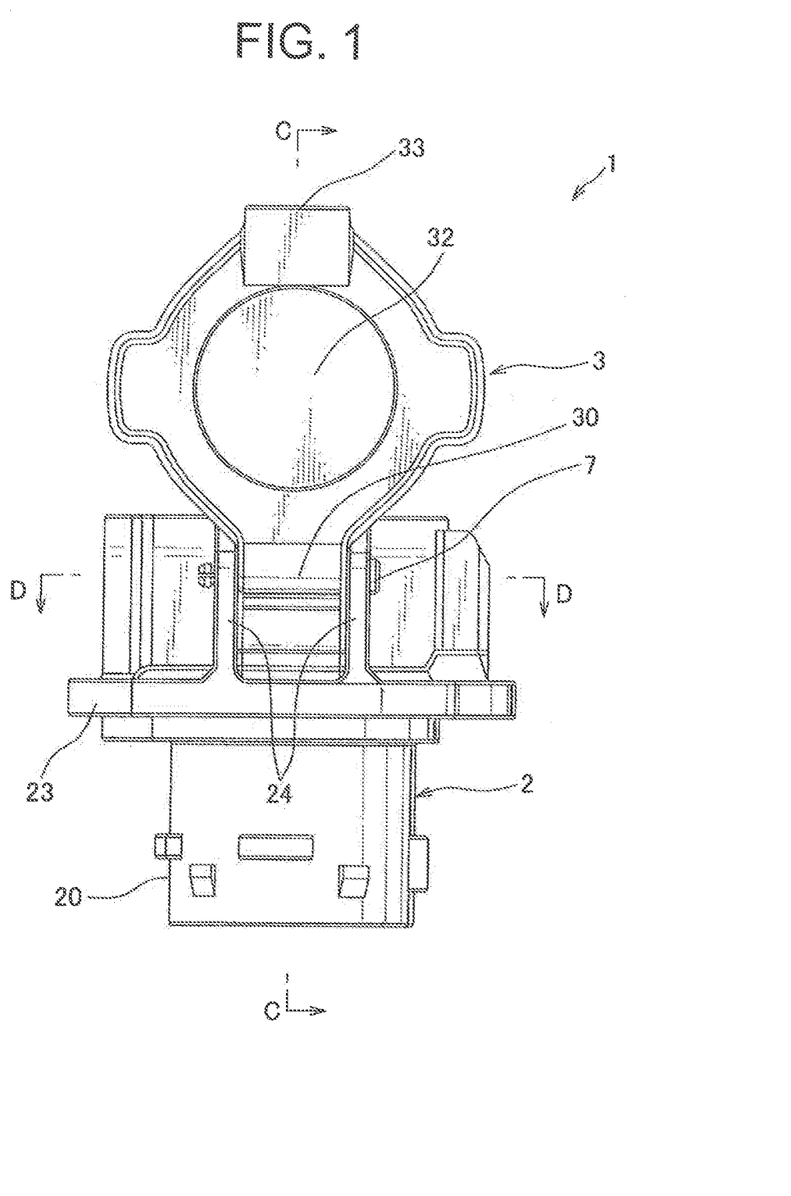
FIG. 1 is a plane view illustrating a connector according to one embodiment of the present invention.
Figure 3:
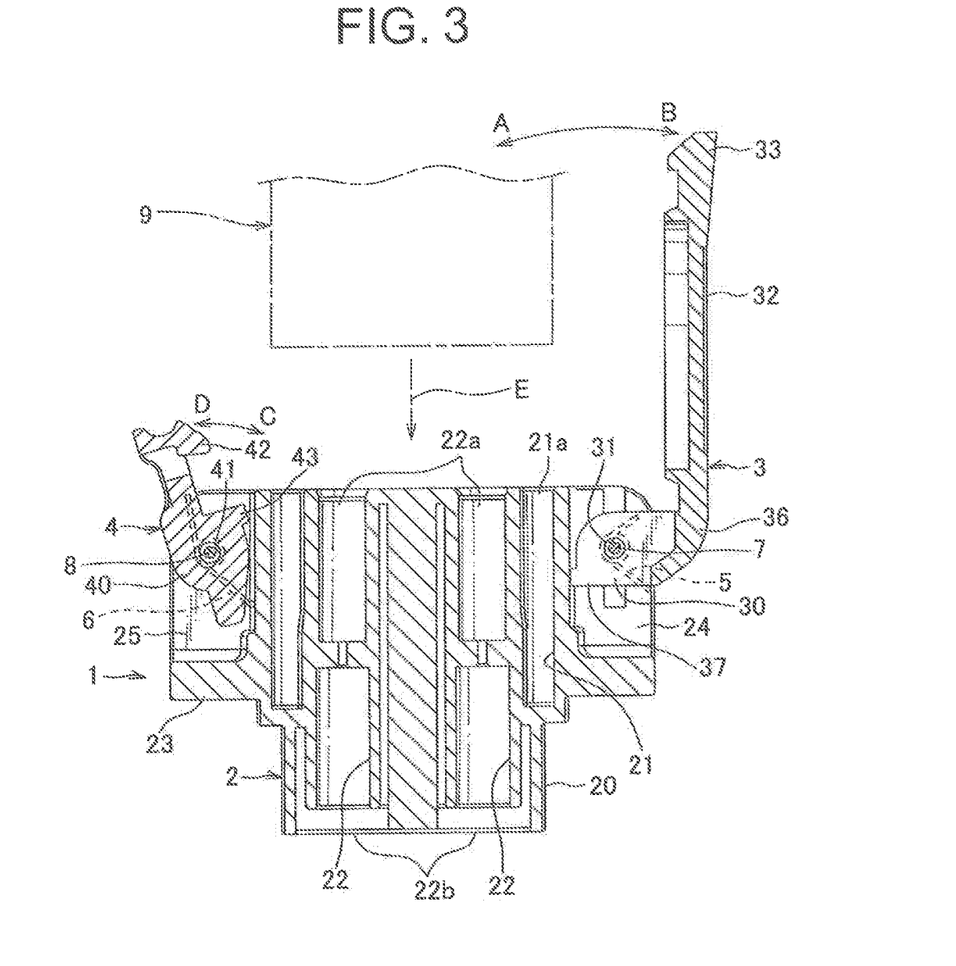
FIG. 3 is a cross-sectional view taken from C-C line in the FIG. 1.
Figure 4:
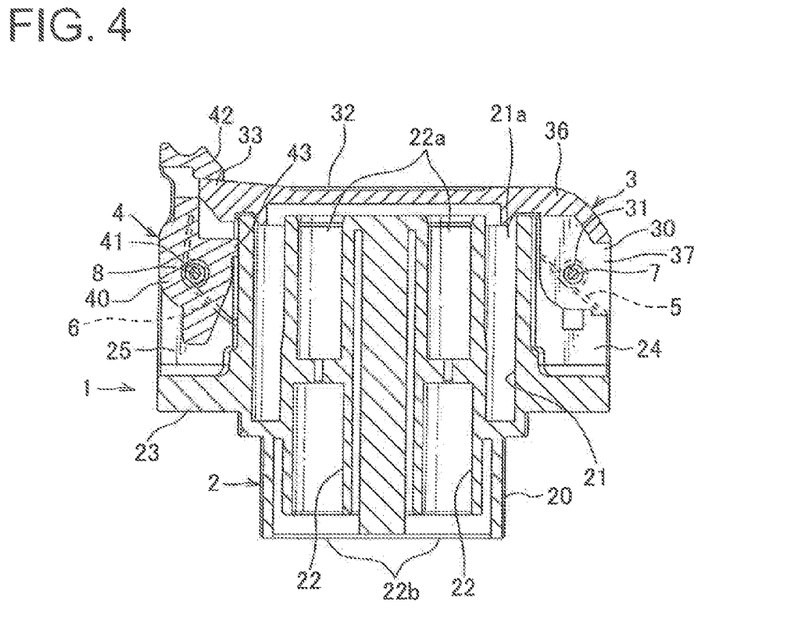
FIG. 4 is a cross-sectional view illustrating a state that the cover shown in FIG. 3 covers an opening of the housing.

A connector 1 shown in FIGS. 1, 3 and 4 is a connector which is mounted in an electric vehicle, and which is connected with a connector 9 (see FIG. 3) of a charging cable for charging battery of the electric vehicle (refer to FIG. 3). The connector 1 is provided with a housing 2, a cover 3 rotatively pivoted about the housing 2 to open and close an openings 21*a* and 22*a* of the housing 2, a spring 5 biasing the cover 3 toward a side away from the openings 21*a* and 22*a*, a lock 4 rotatively pivoted about the housing 2, and engaged with an edge 33 of the cover 3 with the openings 21*a* and 22*a* covered so as to keep its state that the openings 21*a* and 22*a* are covered by the cover 3, a spring 6 biasing the lock 4 toward a side approaching to the openings 21*a* and 22*a*, and shafts 7 and 8.

The housing 2 is made of synthetic resin, which is provided with a housing main body 20, a flange 23 annularly disposed on an outer surface of the housing main body 20, a pair of housing side mounting plates 24 mounting the cover 3, and disposed on the of surface of the housing main body 20, spaced from each other, and a pair of lock mounting plates 25 mounting the lock 4, and disposed on the outer surface of the housing main body 20, spaced from each other.

The aforementioned housing main body 20 is provided with a plurality of terminal cavities 22, and a housing cavity 21 receiving the connector 9 of the aforementioned charging cable. The terminal cavities 22 extends in a direction of engaging with the connector 9 of the charging cable (that is, an arrow E in FIG. 3), and at an upper end and a lower end of the housing main body 20 are formed openings 22*a* and 22*b*, respectively. From the lower end of the opening 22*b* a terminal with electric wire (not shown) is inserted, from the upper end of the opening 22*a* a terminal (not shown) of the connector 9 of the charging cable. These terminal having electric wire and terminal of the connector 9 of the charging cable are engaged within the terminal cavities 22. The housing cavity 21 is made recessed from the upper end of the housing main body 20, and annularly formed so as to surround the plurality of terminal cavities 22. Into the housing cavity 21 is inserted a hood (not shown) of the connector 9 of the charging cable.

The opening 22*a* of the upper end of the terminal cavities 22 and the opening 21*a* of the housing cavity 21 correspond to "opening" recited in the scope of the invention. Namely, the cover 3, when the connector 9 of the charging cable is inserted into the housing 2, opens the openings 21*a* and 22*a*, and covers the openings 21*a* and 22*a* except during charging to prevent water or dust from entering into the housing 2.

The pair of housing side mounting plates 24 is provided with a shaft hole 24*a* (see FIG. 5) passing the shaft 7 therethrough. Also, the pair of lock mounting plates 25 is provided with a shaft hole passing the shaft 8 therethrough. These pair of housing side mounting plates 24 and pair of lock mounting plates 25 are arranged 180-degree opposing each other centering around the housing main body 20.

Figure 2:
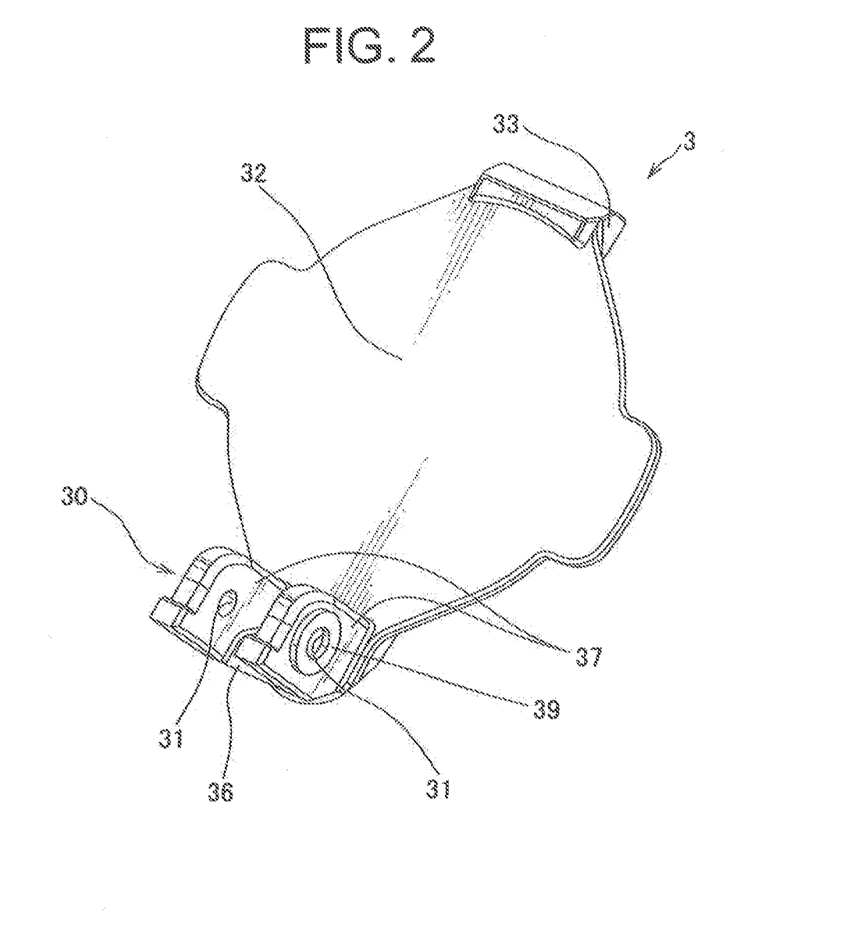
FIG. 2 is a perspective view illustrating the connector shown in FIG. 1.

The cover 3 is made of synthetic resin, which is as shown in FIGS. 2 and 4 provided with a plate 32 stacked onto the upper end of the housing main body 20, an edge 33 disposed at an outer edge of the plate 32, and a base 30 disposed at the outer edge of the elate 32 opposite to the edge 33. The edge 33, as shown in FIG. 4, is positioned outside an outer wall of the housing main body 20. With the edge 33 the aforementioned lock 4 is engaged.

The base 30, as shown in FIG. 2, is provided with a extension 36 extending from the edge of the plate 32, and a pair of cover side mounting plates 37 upstanding from the extension 36 and opposing each other. The pair of cover side mounting plates 37 is provided with a shaft hole 31 passing the shaft 7 therethrough.

The pair of cover side mounting plates 37 is positioned between the pair of housing side mounting plates 24 of the housing 2, and through the shaft hole 31 of the pair of cover side mounting plates 37 and the shaft hole 24*a* of the pair of housing side mounting plates 24 is passed the shaft 7, resulting in such the cover 3 being rotatively pivoted about the housing 2. Also, arrows A, B in FIG. 3 show a rotation direction of the cover 3.

Figure 5:
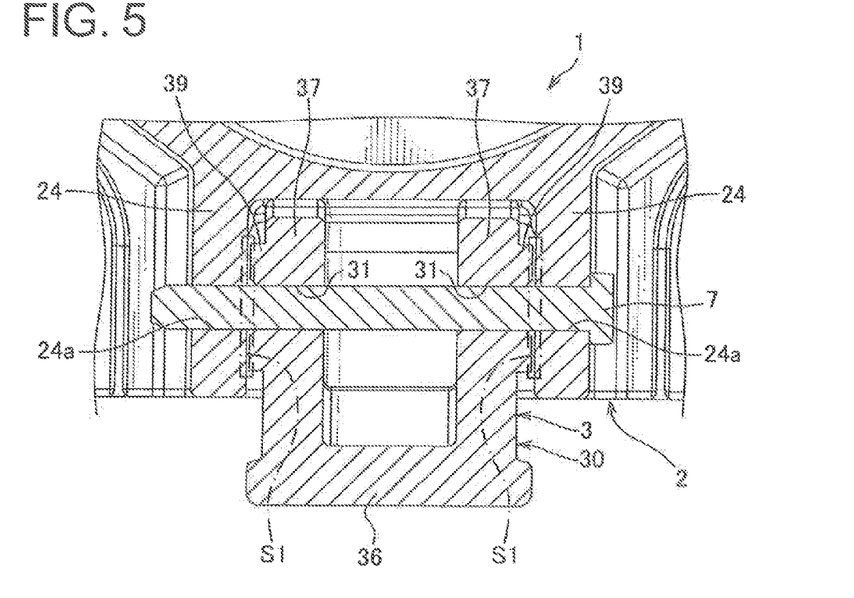
FIG. 5 is a cross-sectional view taken from D-D line in FIG. 1.

Furthermore, as shown in FIGS. 2 and 5, the pair of cover side mounting plates 37 is provided with a boss 39 annularly upstanding from each face opposite to the pair of housing side mounting plates 24, and passing the shaft 7 therethrough. This boss 39 is positioned coaxially with the shaft hole 31. Also, an inner diameter of the boss 39 is made equal to that of the shaft hole 31. An S1 in FIG. 5 shows a fine gap between each of the bosses 39 and each of the housing side mounting plates 24 that oppose each other. In order to avoid any rattle in the cover 3 in the connector of the present invention, a space between each housing side mounting plates 24 and each cover side mounting plates 37 is narrowed as much as possible using the boss 39.

The spring 5 is formed such that a wire is plastically deformed, and is plurally wound in a spiral shape, which is provided with a spiral passing the shaft 7 therethrough, a base side mounting part mounted to the base 30 disposed at one end of the spiral, and a housing side mounting part mounted to the housing 2 disposed at the other end of the spiral. Also, the spring 5 biases the cover 3 in the arrow B direction in FIG. 3.

The lock 4 is made of synthetic resin, which is provided with a base 40 including a shaft hole 41 passing the shaft 8 therethrough, a presser pawl 42 projecting from the base 40 and is positioned an outer surface side of the cover 3 with the openings 21a and 22a covered, and a projection 43 projecting from the base 40 and is positioned nearer the shaft hole 41 than the presser pawl 42. The base 40 is positioned between the pair of lock mounting plates 25 of the housing 2, and through the shaft hole 41 of the base 40 and the shaft hole of the pair of lock mounting plates 25 is passed the shaft 8, resulting in the lock 4 being rotatively pivoted about the housing 2. Also, arrows C, D in FIG. 3 show a rotation direction of the lock 4. Such the lock 4, as shown in FIG. 4, is engaged with the edge 33 in such a way that the edge 33 of the cover 3 with the openings 21a and 22a covered is positioned between the presser pawl 42 and the projection 43.

The spring 6 is formed such that a wire is plastically deformed, and is plurally wound in a spiral shape, which is provided with a spiral passing the shaft 8 therethrough, a base side mounting part mounted to the base 40 disposed at one end of the spiral, and a housing side mounting part mounted to the housing 2 disposed at the other end of the spiral. Also, the spring 6 biases the lock 4 in the arrow C direction in FIG. 3.

Then, operation of opening and closing of the cover 3 of the connector 1 will be discussed. When closing the opening cover, the cover 3 is rotated in the arrow A direction in FIG. 3 against biasing force of the spring 5 with the lock 4 rotated in the arrow D direction in FIG. 3 against the spring 6, then the lock 4 is released to engage the lock 4 with the edge 33 of the cover 3. When opening the closed cover 3, the lock 4 is rotated in the arrow D direction in FIG. 3 against biasing force of the spring 6 with the lock 4. Namely, the lock 4 is released. Then by biasing force of the spring 5 the cover 3 automatically opens in the arrow B direction in FIG. 3.

As discussed with reference to FIGS. 7 to 11, in the conventional connector 201, water such as dew condensation water or rain likely collects in the fine space S2 between each of the housing side mounting plates 224 and each of the cover side mounting plates 237 and 238 by its surface tension, which has induced drawback that the water is frozen in low temperature to cause the cover 203 to unlikely open or close. In the aforementioned connector of the present invention, to the contrary, since the pair of the cover side mounting plates 37 is provided with the boss 39 upstanding from each face opposing the housing side mounting plate 24 is disposed, it is made possible to decrease an area forming the fine space S1 between each of the cover side mounting plate 37 and each of the housing side mounting plates 24, resulting in decrease of water that collects in the fine space S1. Thereby, even when water collecting in the fine space S1 is frozen, it is easy to shear the ice because the ice is too small. Therefore, the cover 3 is allowed to prevent from unlikely opening and closing by freezing of the hinge. Also, the aforementioned "hinge" means a part which is composed of the pair of housing side mounting plates 24, the base 30, and the shaft 7.

Also, in the aforementioned embodiment, while the example in which the pair of cover side mounting plates 37 is provided with the boss 39 upstanding from each face opposing the housing side mounting plates 24, according to the present invention, the pair of the housing side mounting plates 24 may be provided the "boss" upstanding from each face opposing the cover side mounting plates 37.

Figure 6:
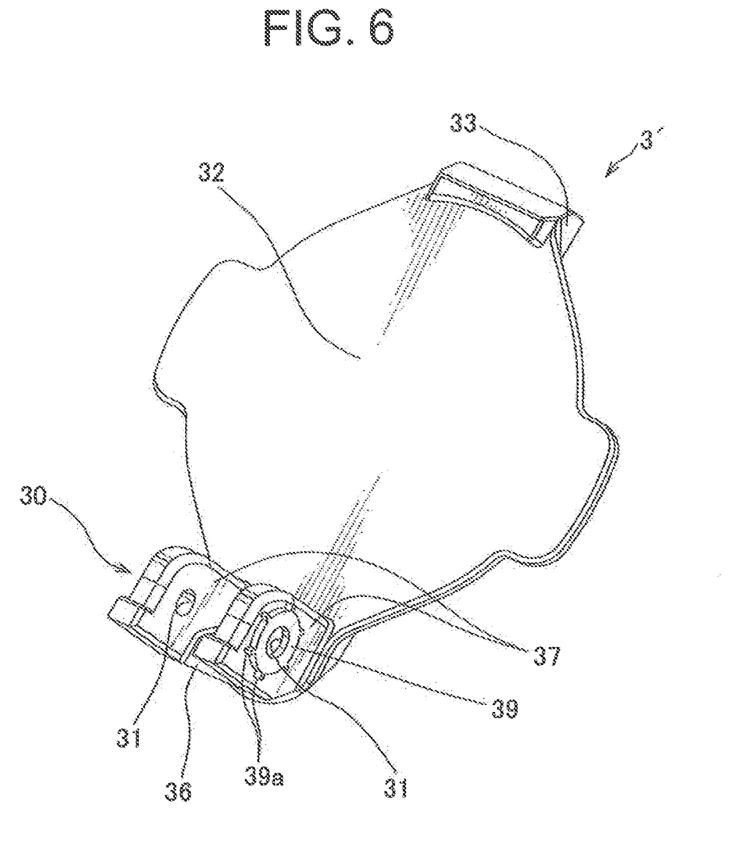
FIG. 6 is a perspective view illustrating a modification of the cover shown in FIG. 2.

Also, in the preset invention, as shown in FIG. 6, on the outer periphery of the boss 39 may be disposed a plurality of projections 39a, and on the outer periphery of the boss 39 a plurality of recesses 39a may be disposed, but not shown. Namely, on the outer periphery of the boss 39 may be disposed projections and recesses. To form projections and recesses on the outer periphery of the boss 39, when ice arises between each of the cover side mounting plates 37 and each of the housing side mounting plates 24 that oppose each other, makes large the shearing force working on the ice by rotating the cover 3, resulting in readily shearing of the ice.

It is to be understood the aforementioned embodiment only shows what the present invention exemplarily represents, but the present invention is not limited to the embodiment. Therefore, unless otherwise such changes and modifications depart from the scope of the present invention hereinafter defined, they should be construed as being included therein.

REFERENCE SIGNS LIST 1 connector
2 housing
3 cover
7 shaft
24 housing side mounting plate
24a shaft hole
31 shaft hole
37 cover side mounting plate
39 boss

The invention claimed is:

1. A connector, comprising:
a housing provided with a pair of housing side mounting plates including a shaft hole passing a shaft therethrough;
a cover rotatively pivoted around the housing so as to open and close an opening of the housing, and provided with a pair of cover side mounting plates including a shaft hole passing the shaft therethrough, the pair of cover side mounting plates being positioned between the pair of housing side mounting plates; and
a boss disposed on one of the pair of cover side mounting plates and the pair of housing side mounting plates, cylindrically upstanding from each of faces opposite to the other of the pairs, and passing the shaft therethrough, wherein at least one of a projection and a depression is formed plurally on a peripheral surface of the boss configured to shear ice between the boss and the one of the pair of cover side mounting plates and the pair of housing side mounting plates when rotating about the shaft.

* * * * *